Dec. 20, 1938.    L. D. MILLS ET AL    2,140,591
CYANIDE SYSTEM
Filed June 1, 1936
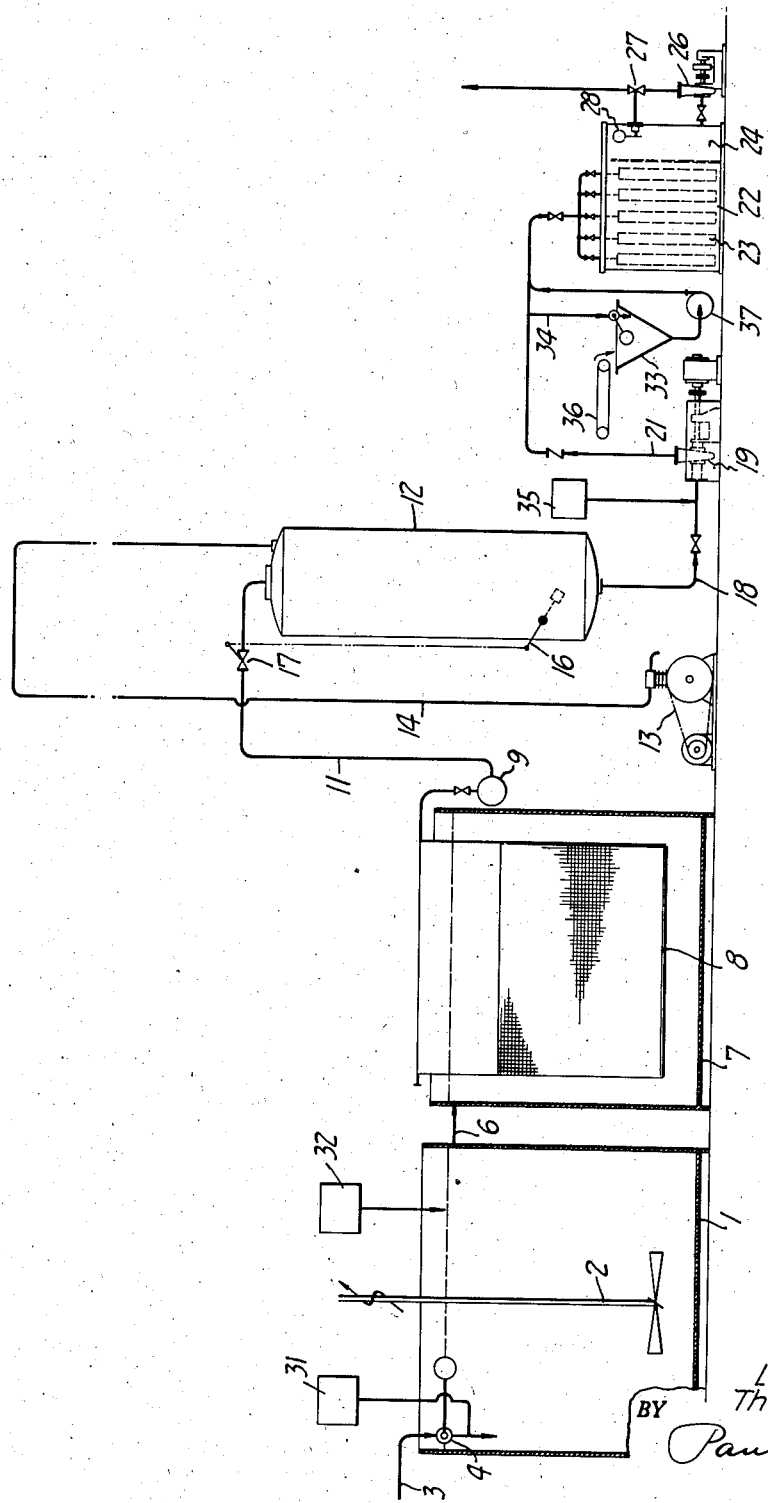
INVENTORS
Louis D. Mills
Thomas B. Crowe
BY
Paul D. Flehr
ATTORNEY Patented Dec. 20, 1938

2,140,591

UNITED STATES PATENT OFFICE 2,140,591

CYANIDE SYSTEM

Louis D. Mills and Thomas B. Crowe, Palo Alto, Calif., assignors to The Merrill Company, San Francisco, Calif., a corporation of California Application June 1, 1936, Serial No. 82,704

8 Claims. (Cl. 75—107)

This invention relates generally to the treatment of pregnant cyanide solution for the precipitation of precious metals. By pregnant cyanide solution we have reference to solutions which have been contacted with finely divided ore, and which contain dissolved precious metals. By precious metals we have particular reference to gold, and also to a somewhat lesser extent, to silver.

The cyanide solutions employed in such processes generally contain variable amounts of free and combined alkali cyanides the free cyanide being present as either sodium, calcium or potassium cyanide. Calcium hydroxide is usually present in sufficient amount to provide a protective alkalinity.

The invention has particular application to processes employing zinc dust as a precipitant with flow of the solution through the elements of a precipitating filter, whereby the precipitated metals are collected in a filter cake. In such processes the character of the filter cake materially affects economy of operation and the efficiency of precipitation. The filter cake not only contains precipitated precious metals, but also some unreacted zinc particles which should contact and complete the precipitation of the solution, as the solution passes through the cake. It is an object of the present invention to insure formation of a filter cake having optimum characteristics with respect to promoting complete and efficient precipitation, together with economy of operation.

Further objects of the invention will appear from the following description in which one convenient procedure for carrying out the process has been outlined in detail, in conjunction with the accompanying drawing.

In general the present process makes use of a coagulant, like glue or alkaline starch. The coagulant is introduced into the unclarified pregnant solution prior to passing the solution through a clarifying filter, and serves to coagulate or flocculate finely divided or colloidal-like solids, whereby such solids are more effectively removed by filtration and do not pass on to appear as troublesome foreign solids in the filter cake of the precipitating filter. The coagulant is introduced in such amount that a part remains in the clarified solution to flocculate other substantially insoluble solids formed in subsequent steps of the process, thereby insuring a filter cake of optimum characteristics in the precipitating filter.

Referring first to the drawing, the apparatus illustrated consists of a storage tank 1, which is provided with a suitable agitator 2. Line 3 represents flow of unclarified pregnant cyanide solution to the tank 1, under the control of float valve 4. By unclarified pregnant cyanide solution we have reference to cyanide solution which has been contacted with finely divided ore solids, after the majority of the ore solids have been removed by gravity settling or filtration, but which requires further clarification before precipitation.

Line 6 represents flow of the solution from the storage tank 1, to a clarifying filter 7. This filter can consist of one or more vacuum clarifying leaves 8, which are immersed in the solution being clarified, and which are connected to the suction manifold 9.

Flow line 11 connects the manifold 9 to a receiver 12, for deaerating the clarified solution. This receiver is maintained under conditions of vacuum, as by means of a vacuum pump 13 which is connected to the receiver by line 14. The level of solution in receiver 12 can be maintained by suitable means, such as a float controlled lever 16, which in turn is connected to the flow control valve 17.

Line 18 connects the lower portion of receiver 12, to the inflow side of the liquid pump 19. This pump is preferably designed to avoid admission of air to the solution being handled, as for example by having its stuffing box immersed in liquid. A flow line 21 is connected to the discharge side of pump 19, and serves to deliver the solution to the precipitating filter 22. Filter 22 may vary as to design, the representative form illustrated being of the pressure type, having a plurality of bag-shaped filter elements 23 which afford suitable filter membranes through which the solution is caused to flow. The tank in which the filter elements 23 are immersed is shown provided with an overflow compartment 24, from which barren solution can be removed by the pump 26. A suitable solution level can be maintained in compartment 24, by a flow control valve 27 in the pump discharge line, and which is mechanically operated by float 28.

Means for feeding various reagents to the solution being treated, have been indicated as follows: Feed means 31 introduces controlled quantities of a soluble lead salt, like lead nitrate or lead acetate, into the unclarified solution contained in storage tank 1. Introduction of this reagent serves to coat the zinc dust precipitant employed with metallic lead, to form an active zinc lead galvanic couple to stimulate precipitation. Feed means 32 is for the purpose of introducing small amounts of the coagulant into the storage tank 1. A suitable coagulant can be prepared by first boiling ordinary vegetable starch and water, and then adding suitable amounts of caustic alkali, such as caustic soda. The amount of caustic alkali added can be substantially equal to one-half of the weight of the starch employed. Feed means 35 represents introduction of an active chemical deoxidizing agent, particularly a hydrosulphite such as sodium, calcium or zinc hydrosulphite. Such reagents can be added in the form of a water solution, to the suction side of pump 19, and serve to remove the remaining traces of dissolved oxygen from the solution.

Various mechanical expedients can be employed for introducing a metallic precipitant like zinc dust into the solution, after the solution has been conditioned by clarification and removal of dissolved oxygen. Thus a mixing cone is shown, into which a part of the conditioned solution is diverted by line 34. Zinc dust is supplied to the cone 33 at a properly regulated rate, as by the zinc dust feeder 36. Within the cone 33 the zinc dust is intermixed with the solution to form what is commonly known as "zinc dust emulsion". This emulsion is delivered by pump 37 to the flow line 21.

When the solution following introduction of zinc dust is immediately caused to flow through filter elements, the completeness and efficiency of precipitation and other factors such as the assay value of the filter cake and economy of operation, are affected to a marked degree by the amount and character of foreign solids, in addition to the desired precious metals and particles of residual zinc, contained in the filter cake. The presence of finely divided or colloidal-like foreign solids in the filter cake serves to insulate the zinc particles from contact with the solution, and in addition causes rapidly increasing filter pressures, thus requiring frequent removal of the filter cake or replacement of the filter elements. The amounts of such foreign solids vary in practice with the type of ore and solution being treated, but in many instances, they are encountered to such an extent as to seriously interfere with the efficiency of recovery, even though the solution is subjected to conventional clarification before removal of dissolved oxygen. Certain solids of the type to which we have reference are not removed by ordinary filtration methods, and some may precipitate out of the solution after clarification.

One source of such detrimental solids, tending to accumulate in the precipitating filter, consists of finely divided slimes, largely derived from the clayey or talcose portions of the ore being treated. Such particles are so finely divided as to approach a colloidal condition and frequently exhibit a true Brownian movement. They may originate from the finest portions of the original ore slime, remaining in suspension after preliminary settlement, or they may result from the formation of insoluble hydrates of aluminum, iron, or magnesium, which tend to precipitate out in gelatinous form when the pregnant solutions are permitted to stand for any appreciable time. Certain compounds, such as silica may exist in the solution as colloidal suspensions or be to some extent dissolved in the solution and thus pass with the solution through the pores of the clarifying filter, to subsequently appear as deleterious solids or precipitates in the precipitating filter. It will be evident that a considerable percentage of such solids can not be removed when unclarified pregnant solution is subjected to conventional clarification, due to their extreme fineness or colloidal-like nature, or because they are virtually dissolved. In the present process such solids are more effectively removed by introduction of the alkaline starch or similar coagulant, into the storage tank 1. Intermixture of the alkaline starch with the unclarified solution causes coagulation of silica and other finely divided solids, so that such materials are more effectively filtered out and retained within the cake formed on the clarifying filter leaves 8. Thus there is a minimum of such solids in the filter cake formed on the filter elements 23 of the precipitating filter.

In order to further facilitate clarification to produce a "brilliant" or "sparkling" filtrate, suitable amounts of a filter aid like diatomaceous earth can be added to the solution, either continuously, or at intervals when new or washed filter leaves are placed in service. Such practice makes the filter cake more porous, thus increasing filter capacity and facilitating cleaning of the filter leaves.

A further source of finely divided foreign solids, which in prior processes tend to accumulate in the filter cake on the precipitating filter, consists of substantially insoluble by-products, resulting from the introduction of soluble lead salts, such as lead nitrate or lead acetate previously mentioned. When such soluble lead salts are introduced into the cyanide solution, they are converted by the caustic lime to the form of lead plumbite, which is subsequently precipitated by zinc to form metallic lead, which coats the zinc particles. Because of the complexity of cyanide solutions, it frequently happens that compounds are present which combine with a part of the lead salt, to form substantially insoluble solids, such as lead sulphate, an extremely fine precipitate, which unless coagulated, will pass through an ordinary filter. Such precipitates have a detrimental effect upon the precipitating operation, substantially as described above with respect to finely divided slime solids from the ore. In the present process such objectionable precipitates if formed to any extent, are formed within the tank 1, and are likewise coagulated by the alkaline starch so that they are more effectively removed on the clarifying filter leaves 8.

In the foregoing we have referred to the coagulating action of the alkaline starch or like coagulant, to enable removal of objectionable solids from the solution in the clarifying filter, both with respect to solids in the unclarified solution originating with the ore being treated, and other precipitated solids including those which may result from the introduction of soluble lead salts. In practice no great amount of alkaline starch or like coagulant need be introduced. For example, not more than .01 to .02 pound of starch need be employed per ton of solution treated. Alkaline starch used in this manner is not completely consumed or removed from the solution in the clarifying filter 7, but some residual alkaline starch remains in the solution, and passes through the deoxidizing operations to the precipitating filter.

The presence of such residual starch is beneficial, because it results in formation of a porous and spongy cake on the filter elements 23. The residual starch not only flocculates or coagulates finely divided foreign solids of the filter cake, but also flocculates the finely divided metallic precipitate. Similarly any by-products precipitated as a result of introducing hydrosulphite into the solution, as for example sulphates, are coagulated by the residual starch. Likewise insoluble gelatinous zinc compounds such as zinc hydrates and zincates, which are apt to be formed and precipitated as a result of contacting the solution with zinc dust, are likewise coagulated. Such coagulated solids are readily filterable and together with the metallic precipitate and residual zinc particles, form a homogeneous porous filter cake, through which the solution can flow uniformly without building up undue filter pressures, and with good contact between the solution and the zinc particles present. Such effective contact with the zinc particles is promoted both because of the homogeneous character of the cake, and because of the absence of uncoagulated gelatinous compounds which would otherwise surround the zinc particles and prevent their proper contact with the metal bearing solution.

The use of alkaline starch or like coagulant in the manner described above, should be distinguished from the function of protective lime which is ordinarily present in alkaline cyanide solution. Protective lime is likewise a coagulant, but its efficiency in this respect is not comparable to alkaline starch. Furthermore in many cyaniding systems it has been found that considerable amounts of lime in the cyanide solution causes detrimental effects, and interferes with efficient precipitation. In this connection it has been found that an increase in protective lime is accompanied by an increase in the formation of detrimental gelatinous precipitates, such as zincates. Our process makes it possible to maintain the alkalinity of the solution between optimum limits, and at the same time affords an efficient procedure for coagulating foreign solids, which otherwise would tend to cause difficulty in the precipitating filter. In practice our process can be used to advantage to promote efficient precipitation of precious metals, irrespective of the amount of protective alkali present in the solution.

In the process described, the solution, after clarification, is subjected to mechanical deaeration and then to chemical deoxidation to remove remaining traces of dissolved oxygen. Mechanical deaeration can be omitted if desired, provided sufficient amounts of the hydrosulphite are employed to remove all of the dissolved oxygen. Generally, it will be found desirable to utilize the relatively cheap expedient of removing a large part of the dissolved oxygen by mechanical deaeration, in order to economize in the use of hydrosulphite, and in order to minimize the formation of substantially insoluble compounds, which may accompany the introduction of this chemical.

Certain features of the invention are applicable to processes in which the solution, following clarification, is precipitated by causing it to flow through zinc shavings. In such a process alkaline starch or a like coagulant is added to the solution in an agitating tank, immediately prior to passing the solution through a clarifying filter, like the filter 7 described above. After such clarification the solution, which retains some alkaline starch, is caused to flow through conventional zinc boxes or zinc shavings. If desired the solution after clarification can be further conditioned for precipitation by removal of dissolved oxygen, in the manners previously described. Finely divided solids removed by clarification minimize the amount of foreign solids accumulating in the zinc boxes, and such extraneous solids as may accumulate in the zinc boxes are coagulated by the residual alkaline starch. Thus good contact between the solution and the zinc is promoted, and a maximum amount of precious metal can be precipitated before the zinc shavings are replaced or reactivated. It is to be understood that the use of a precipitating filter is to be preferred, and that such a process is benefited to a greater degree by the use of a coagulant.

We claim:

1. In a process of treating unclarified alkaline cyanide solution containing dissolved precious metals and from which the majority of ore solids have been removed by gravity settling, clarifying the solution by filtration while the solution contains a soluble starchy coagulant, subjecting the clarified solution to chemical deoxidation, and then precipitating the solution by contacting the same with zinc dust together with flow of the solution through a precipitating filter.

2. In a process of treating unclarified alkaline cyanide solution containing dissolved precious metals and from which the majority of ore solids have been removed by gravity settling, clarifying the solution by filtration while the solution contains a soluble starchy coagulant, subjecting the clarified solution to mechanical deaeration, subjecting the mechanically deaerated solution to chemical deoxidation to remove the remaining traces of oxygen, and then precipitating the solution by contacting the same with zinc dust together with flow of the solution through a precipitating filter.

3. In a process of treating unclarified alkaline cyanide solution containing dissolved precious metals and from which the majority of ore solids have been removed by gravity settling, introducing a soluble starchy coagulant and also a soluble lead salt into the solution, subjecting the solution to clarification by filtration, subjecting the clarified solution to mechanical deaeration, removing remaining traces of dissolved oxygen from the solution by chemical deoxidation, and then effecting precipitation of the solution by contacting the same with zinc dust together with flow of the solution through a precipitating filter.

4. In a process of the character described, introducing a soluble starchy coagulant into unclarified cyanide solution containing dissolved precious metals, clarifying the solution by filtration, introducing a hydrosulphite into the clarified solution to effect chemical deoxidation of of the same, and then effecting precipitation of the solution by introduction of zinc dust into the same together with flow of the solution through a precipitating filter.

5. In a process of the character described, introducing a soluble starchy coagulant into unclarified cyanide solution containing dissolved precious metals, likewise introducing a soluble lead salt into the unclarified solution, subjecting the unclarified solution to filtration to effect clarification of the same, removing dissolved oxygen from the clarified solution by the introduction of a hydrosulphite, introducing zinc dust into the solution, and causing the solution to flow through elements of a precipitating filter.

6. In a process for precipitating pregnant cyanide solution, removing dissolved oxygen from the solution, by introducing a chemical deoxidizing agent into the same, introducing zinc dust into the deoxidized solution, and causing the solution to flow through elements of a precipitating filter while it contains alkaline starch.

7. In a process for precipitating precious metals from pregnant cyanide solutions, adding alkaline starch to the solution, passing the solution through a clarifying filter, removing dissolved oxygen from the solution, adding metallic zinc dust to the solution and passing the mixture of clarified, deoxygenated solution and zinc dust through a precipitating filter, to effect precipitation of the precious metals.

8. In a process for precipitating precious metals from pregnant cyanide solutions, adding alkaline starch to the solution, passing the solution through a clarifying filter, subjecting the solution to mechanical deaeration, adding metallic zinc dust to the deaerated solution and passing the mixture of clarified, deoxygenated solution and zinc dust through a precipitating filter, to effect precipitation of the precious metals.

LOUIS D. MILLS.
THOMAS B. CROWE.